R. P. PEARSON.
Loom-Temple.
No. 209,419. Patented Oct. 29, 1878.
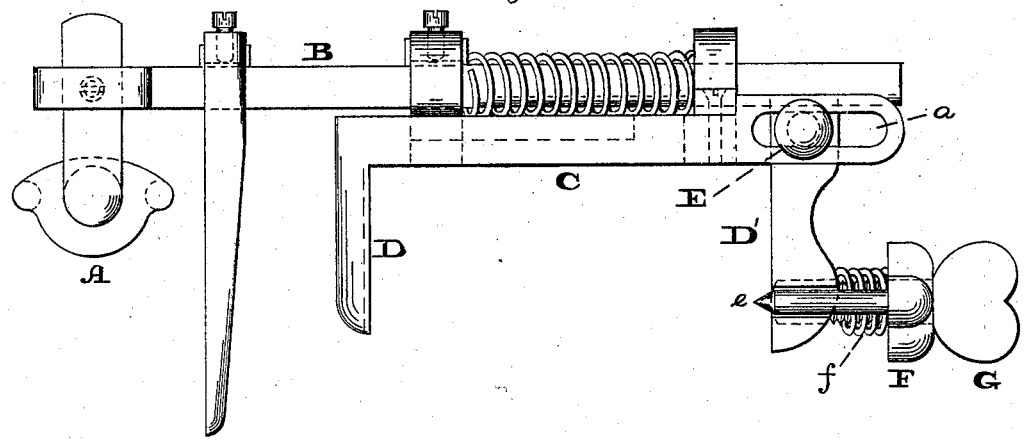
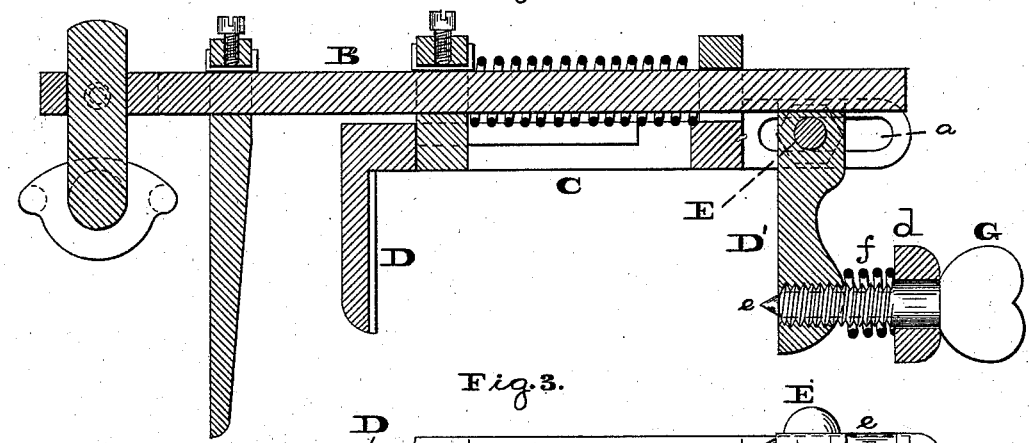
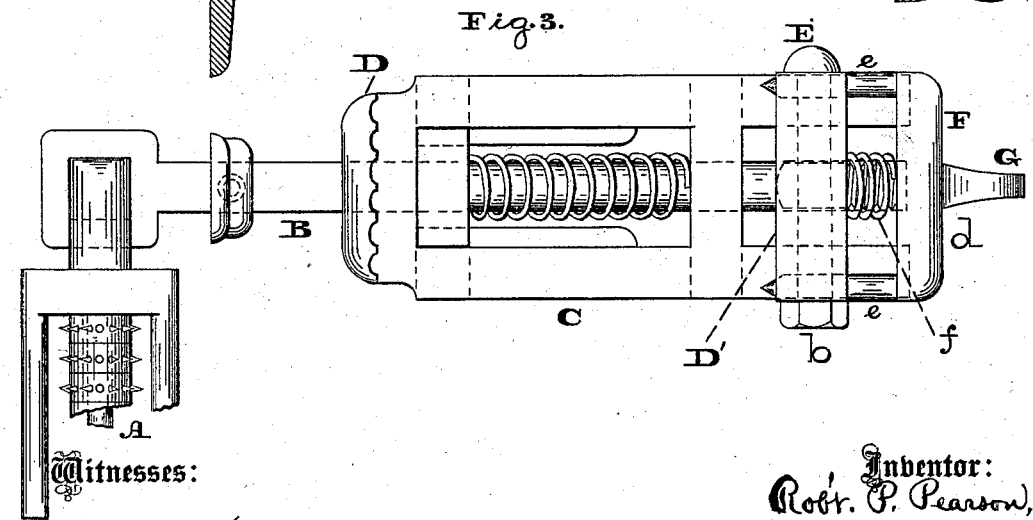
Witnesses:
W. F. Kircher
A. P. Grant
Inventor:
Rob't. P. Pearson,
by John A. Wiedersheim
ATTORNEY.

UNITED STATES PATENT OFFICE.

ROBERT P. PEARSON, OF PHILADELPHIA, PENNSYLVANIA, ASSIGNOR, BY MESNE ASSIGNMENT, TO THE DUTCHER TEMPLE COMPANY, OF MILFORD, MASSACHUSETTS.

IMPROVEMENT IN LOOM-TEMPLES.

Specification forming part of Letters Patent No. 209,419, dated October 29, 1878; application filed January 29, 1878.

*To all whom it may concern:*

Be it known that I, ROBERT P. PEARSON, of the city and county of Philadelphia, and State of Pennsylvania, have invented a new and useful Improvement in Loom-Temples, which improvement is fully set forth in the following specification and accompanying drawings, in which—

Figure 1 is a side elevation of the loom-temple embodying my invention. Fig. 2 is a central vertical longitudinal section thereof. Fig. 3 is a bottom view thereof.

Similar letters of reference indicate corresponding parts in the several figures.

My invention consists of a temple having an adjustable connecting-frame, so as to be applicable to breast-beams of varying thickness.

It also consists of a clamp, which is fitted to the frame, for firmly connecting the temple to the beam.

Referring to the drawings, A represents the temple roll or jaw, and B the spindle thereof, which parts may be of desired form and construction.

C represents the frame which supports the spindle, and it is provided with depending arms D D', for attachment of the temple to the breast-beam.

At the sides of one end of the frame C there are slots $a$ $a$, which extend horizontally and longitudinally, and through the same is passed a bolt, E, also passing through the upper end of depending arm D'.

It will be seen that the arm D' may be moved and the two arms thus adjusted relatively to the thickness of the breast-beam, whereby the temple is applicable to beams of various thicknesses. After the adjustment is accomplished the nut $b$ of the bolt E is tightened, and thus the arms D D' retain their adjusted positions.

F represents a clamp, consisting of a transversely-extending bar, $d$, with longitudinally-extending side pieces, $e$, which latter pass through openings or grooves in the arm D' of the frame C.

Through the bar $d$ is loosely passed a screw, G, whose threads engage with the arm D'; and interposed between the said arm and the bar $d$ is a coiled spring, $f$, which encircles the screw.

The ends of the pieces $e$ may be pointed or blunt, as desired.

It will be seen that when the temple is attached to the beam by means of the arms D D' and the screw G is properly rotated the pieces $e$ of the clamp will be forced tightly into or against the breast-beam. This moves the adjacent arm away from the beam, and consequently draws the opposite arm tightly against the beam, whereby the temple will be firmly secured to the beam.

When the temple is to be removed the screw will be rotated in the direction from the bar D'. The clamp is no longer controlled by the screw, and the spring $f$ then forces said clamp outward, the arms D D' being thereby free to clear the breast-beam.

It is evident that the arm D may be adjustably connected to the frame C in a manner similar to the arm D'.

Having thus described my invention, what I claim as new, and desire to secure by Letters Patent, is—

1. As an improvement in loom-temples, the temple-frame C, in combination with the depending arms D D', rendered adjustable by means of the slots $a$ and bolt E, and operating substantially as and for the purpose herein set forth.

2. The frame C, with depending arms D D', in combination with the clamp F, having side pieces, $e$, and the screw G, substantially as and for the purpose set forth.

ROBERT P. PEARSON.

Witnesses:
JOHN A. WIEDERSHEIM,
SAML. M. GRICE.